United States Patent
Reaney

(10) Patent No.: US 6,399,802 B2
(45) Date of Patent: Jun. 4, 2002

(54) METHOD FOR SOAPSTOCK ACIDULATION

(75) Inventor: Martin J. T. Reaney, West Des Moines, IA (US)

(73) Assignee: KRU Feed Energy Company, Des Moines, IA (US)

( * ) Notice: Subject to any disclaimer, the term of this patent is extended or adjusted under 35 U.S.C. 154(b) by 0 days.

(21) Appl. No.: 09/813,475

(22) Filed: Mar. 21, 2001

Related U.S. Application Data

(60) Provisional application No. 60/191,948, filed on Mar. 24, 2000.

(51) Int. Cl.$^7$ .............................................. C11B 13/02

(52) U.S. Cl. ...................... 554/179; 554/177; 554/186; 554/206; 554/211; 554/212

(58) Field of Search ................................ 554/177, 179, 554/186, 211, 206, 212

(56) References Cited

U.S. PATENT DOCUMENTS 6,172,248 B1 * 1/2001 Copeland et al. ........... 554/190

* cited by examiner

Primary Examiner—Deborah D. Carr
(74) Attorney, Agent, or Firm—Henderson & Sturm LLP

(57) ABSTRACT

Methods for acidification of soapstock and recovery of acidulated fatty acids are disclosed. Further methods of conversion of the acidulated fatty acids to esters are also disclosed. Further methods of crystallizing the acidulated fatty acids from the extraction solvent at low temperatures and fractionating the acidulated fatty acids from the extraction solvent using urea are also disclosed. The novel method of adding both a monohydric alcohol to the soapstock to lower viscosity and a strong acid to hydrolyse the soaps prevents the formation of emulsions of soaps and oils. The preferred embodiment uses a soapstock such as soybean soapstock, sulphuric acid and isopropanol. The novel process allows the quantitative recovery of fatty acids and glyceride from the soapstock by removal of the alcohol by evaporation. Alternatively the fatty acids and glyceride may be converted to esters of monohydric alcohols. It is a unique property of this extractive process that the recovered fatty acids are present in solution in a monohydric alcohol and a catalyst for esterification. Heating the fatty acid, glyceride and monohydric alcohol solution produces fatty esters of the extractive alcohol. This simplified process efficiently produces fatty esters from soapstock with the minimum of process steps. Chilling the fatty acid, glyceride and monohydric alcohol solution allows the selective crystallization of fatty acids. Treating the fatty acid, glyceride and monohydric alcohol solution with urea allows the specific crystallization of fatty acids. This simplified process efficiently fractionates soapstock with the minimum of process steps. The acid water released from this novel process is heavily laden with both organic and inorganic solutes. Unique processes for recovery of valuable inorganic and organic constituents from the acid water are also described.

12 Claims, 2 Drawing Sheets

METHOD FOR SOAPSTOCK ACIDULATION

CROSS REFERENCE TO RELATED APPLICATIONS

This application contains disclosure from and claims the benefit under Title 35 United States Code §119(e) of United States Provisional Application Ser. No. 60/191,948, filed Mar. 24, 2000 and entitled "Method for Soapstock Acidulation".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This is an improvement in the process for separation of soap from soapstock. The process overcomes problems with an intractable emulsion that occurs between acidulated fatty acids and water by treatment of the soapstock with both an acid and a monohydric alcohol or mixture of monohydric alcohols. The reaction is unique in that it allows the quantitative recovery of fatty acids from soapstock with the addition of monohydric alcohols and stoichiometric addition of acid. Large excesses of acid are required for acidulation without the addition of monohydric alcohols. The process aqueous by-product stream is recovered by ultrafiltration, electrolysis and ion exchange chromatography to minimize process waste and recover value-added products streams from the soapstock by-product water.

2. Description of the Related Art

Crude glyceride oils such as soybean and canola oil contain free fatty acids and other impurities. Contacting the crude oil with aqueous alkali in a batch or continuous process refines such crude oil. The alkali reacts with the free fatty acids to form soap that may be separated from the oil by settling or centrifugation. The separated soap material is referred to as soapstock that is a lipid-rich byproduct of vegetable oil refining. It contains substantial amounts of glyceride, phosphoglyceride and free fatty acid, the latter as their sodium or, less commonly, potassium salts. From soybean, the predominant source of edible oil in the United States, soapstock is generated at a rate of about 6% of the volume of crude oil produced (Anonymous, Soya Bluebook Plus, Soyatech, Inc., Bar Harbor, Me., 1995, p. 262.), amounting to as much as approximately one billion pounds of soapstock annually. Its price can be as low as one-tenth that of refined vegetable oil. Where possible, recovery of value from soapstock is achieved by adding a mineral acid to the soapstock to separate lipids from the water, sodium and other contaminants.

When allowed to settle acidified soapstock separates into 3 layers. The top layer is the desired fatty acid rich lipid product. The middle layer is an emulsified material containing lipid, salts and water and the bottom layer contains primarily salt water and dissolved organic compounds. While the top layer has considerable value as a source of lipids the other layers provide little or no economic return. The emulsion layer produced from splitting soapstock can detrimentally affect the recovery of the oil product. Johansen et al. (Journal of the American Oil Chemist's Society Vol. 73, pp. 1275–1286) extracted six soapstock samples by sequentially adding sulfuric acid then centrifuging the samples at 8,000-x gravity and measured the volume of the three layers. The emulsion layers varied from 0 to 56% of the total post acidulation sample volume. Four of the six samples produced 26 percent emulsion or greater. Their analysis further revealed that the middle emulsion layer entrained large amounts of lipids that hampered efficient separation of lipid and water layers. The difficulty of separating oil and water from acidulated soapstock also occurs in industrial separations. For example, Brister (U.S. Pat. No. 4,671,902) reacted 75,000 liters of soybean soapstock with sulfuric acid to obtain 28,000 kg of fatty sludge containing 17,000 kg of fatty acids. Brister recovered the fatty acids from the sludge by addition of antifoam and spray drying the entire sludge volume to reduce the water content to less than 3.5 percent. This method though effective required the evaporation of almost 10,000 kg of water, a process step requiring substantial amounts of energy.

Dowd (Journal of the American Oil Chemist's Society Vol. 73 pp. 1287–1295) analyzed cottonseed soapstock and found that it contained a series of water-soluble compounds. Johansen et al. (Journal of the American Oil Chemist's Society Vol. 73, pp. 1275–1286) reported between 2.5% and 15% dissolved solids in the acid water of acidulated soapstock. The dissolved solids certainly contained sulfuric acid and sodium sulfate as residual salts from acidulation but many potentially valuable soluble compounds were also identified. These compounds included glycerol and inositol phosphates as well as other carbohydrates. Johansen et al. further noted that potentially valuable phosphorylated carbohydrates were present in the acid water and that these compounds might be recovered by strong base ion exchange chromatography. However the presence of large amounts of sulfate ion in these preparations would certainly prohibit efficient recovery of these materials from soapstock using ion exchange chromatography.

Some methods for the production of esters of lower alcohols from soapstock have been reported (e.g. Canadian patent application 2,131,654). However, the adoption of these may be limited by their use of elevated temperatures and pressures, incomplete esterification of all fatty acids in the starting material, and/or relatively long incubation times. Haas et al (Haas, M. J., and K. M. Scott, Combined Nonenzymatic-Enzymatic Method for the Synthesis of Simple Alkyl Fatty Acid Esters from Soapstock, *J. Am. Oil Chem. Soc.* 73:1393–1401 (1996)) described a two-step method for the production of biodiesel from soapstock. However, this method achieved esterification of only 81% of the total fatty acids, and involved the use of lipase catalysis. It is possible that the cost and operational requirements associated with enzymatic catalysis might retard adoption of the process.

BRIEF SUMMARY OF THE INVENTION

Soapstock, a by-product of the oilseed processing industry, contains lipids, water and water-soluble organic materials. Although soapstock has a relatively low value it may be readily converted into more valuable products by addition of strong mineral acids in a process known as acidulation. The conventional process for acidulation and recovery of lipids from soapstock requires the addition of large excesses of acid at high temperatures to recover the fatty acid rich oil. In the conventional process a large volume of emulsion is formed that entrains lipids making them unavailable and the resulting emulsion has little commercial value in spite of its lipid content. The present invention discloses a unique process for total recovery of lipids from soapstock by acidulation in a solution containing a monohydric alcohol. The process occurs at lower temperatures than the conventional method and requires the addition of only enough acid to hydrolyse the soaps present in the soapstock. Once recovered, the lipids may be readily sold as acidulated soapstock or converted advantageously to alkyl esters of monohydric alcohols. Acid water produced by this extraction method has a lowered content of inorganic solutes and may be efficiently deionised by any of a number of commercial methods. The deionised by-product water may then be efficiently extracted to concentrate more valuable dissolved components.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
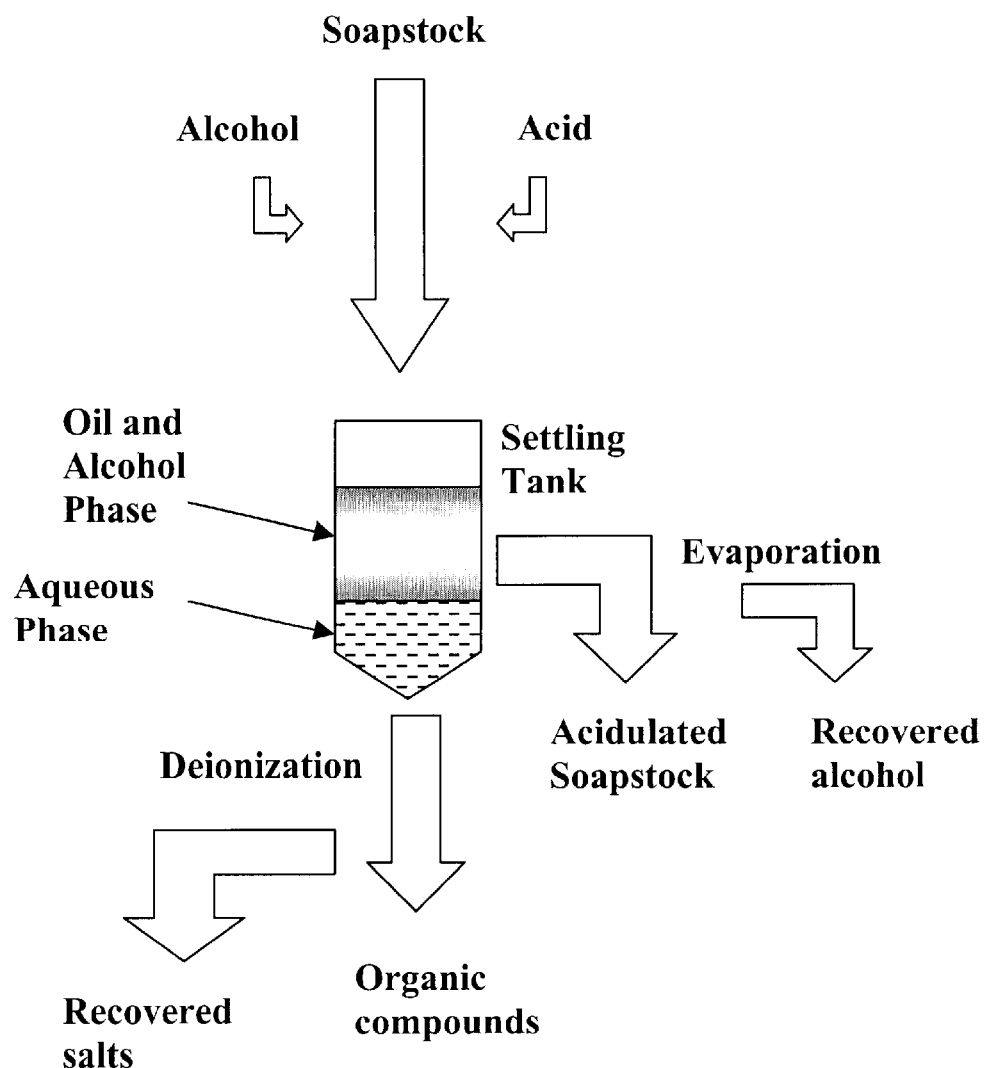
FIG. 1 is a flow diagram illustrating the present invention.

The disclosed process allows the quantitative separation of soapstock into its constitutive components and chemically processing some of those components. The process involves adding between 10 and 100% (preferably between 15 and 30%) monohydric alcohol by weight of soapstock (FIG. 1). The alcohol is selected from those alcohols that are not readily dissolved in water or have low solubility in water containing large quantities of dissolved salts. Preferred alcohols include isopropanol, n-propanol, isoamyl alcohol and fusel oil (a mixture of alcohols). The acid is added in sufficient quantities to acidify all of the soap present. After mixing the acid, soapstock and alcohol the acid water may be allowed to spontaneously separate from the alcohol containing oil layer by sedimentation or the phase separation may be accelerated by centrifugation in a suitable commercial liquid-liquid centrifuge (FIG. 1). Alcohol is recovered from both phases by evaporation (FIG. 1). Separation is most effective when the pH of the acid water is between 0 and 5 and preferably pH 4.0. The aqueous phase of the new process is unique when compared to the aqueous phase prepared by the conventional processes in that it has a substantially less acid and a lower concentration of inorganic ions. As such, the aqueous phase of the present invention may be efficiently deionised using conventional methods. Or where the salt of the acid is insoluble in aqueous solutions the salt may be precipitated by the addition of alcohol.

Figure 2:
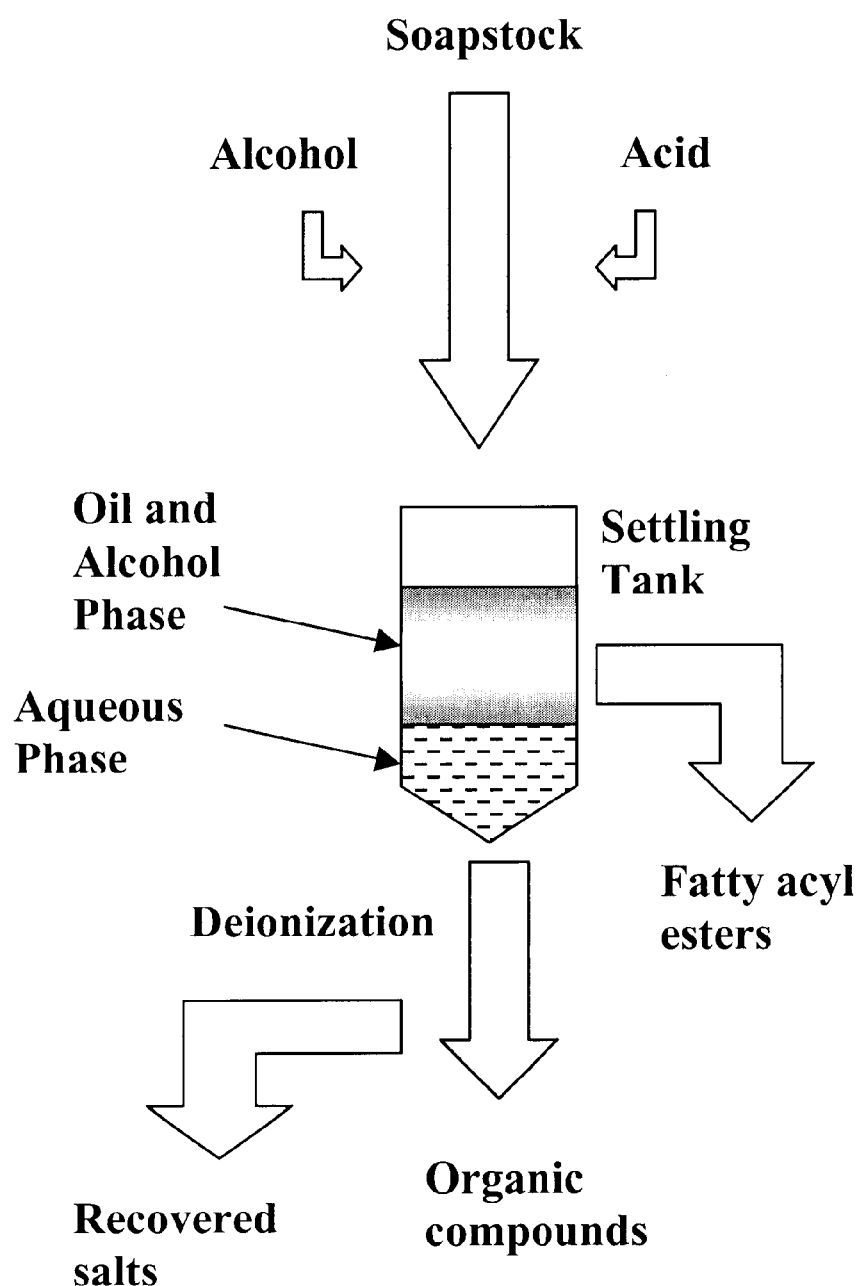
FIG. 2 is a flow diagram illustrating additional features of the present invention.

The fatty acid enriched layer containing alcohol and fatty acids can be readily processed to yield either an acidulated soapstock or an alkyl ester (FIG. 2). The acidulated soapstock is recovered by evaporation of the alcohol in a suitable evaporator. The conversion of the lipid rich layer to fatty acid alkyl esters of the extraction solvent is readily achieved by a heating the layer while continuously removing water of reaction. As the same alcohol is being used to both extract the lipids and esterify the fatty acids substantial efficiencies of energy utilization are achieved.

EXAMPLES

Example 1

Conventional Processing of a Soybean Soapstock

Commercial soybean soapstock that was known to separate efficiently during acidulation was selected for comparison. Soybean soapstock (1000 g) was treated with 50 g of sulphuric acid then stirred vigorously for 2 minutes followed by heating at 80° C. for 30 minutes. The sample was allowed to settle in a temperature-controlled oven and the volume of the three phases formed was quantified. After heating the upper phase of acidulated oil formed was 450 g the middle phase of emulsion was 70 g and the lower phase of aqueous phase was 490 grams.

Examples 2

Conventional Processing of a Canola Oil Soapstock

Commercial soapstock from canola has been difficult to process efficiently for the recovery acidulated fatty acids using conventional approaches as given in example 1. Canola soapstock (1000 g) was treated with 50 g of sulphuric acid then stirred vigorously for 2 minutes followed by heating on a hotplate at 80° C. for 30 minutes. The sample was allowed to settle in a temperature-controlled oven at 80° C. and the volume of the three phases formed was quantified. After heating the upper phase of acidulated oil formed was 100 g the middle phase of emulsion was 420 g and the lower phase of aqueous phase was 400 grams. Losses due to evaporation and transfer accounted for the remaining material.

Example 3

Conventional Processing of a Soybean Soapstock That has Fermented During Storage Commercial soapstock from soybean that has fermented during storage is difficult to process and recovery of acidulated fatty acids using a conventional approach to acidulation as given in example 1 is usually poor. Fermented soybean soapstock (1000 g) was treated with 50 g of sulfuric acid then stirred vigorously for 2 minutes followed by heating on a hotplate at 80° C. for 30 minutes. The sample was allowed to settle in a temperature-controlled oven at 80° C. and the volume of the three phases formed was quantified. After heating the upper phase of acidulated oil formed was 210 g the middle phase of emulsion was 250 g and the lower phase of aqueous phase was 510 grams. Losses due to evaporation and transfer accounted for the remaining material.

Example 4

Processing of a Commercial Canola Soapstock with Isopropanol

Commercial canola soapstock from the same sample used in example 2 (1000 g) was mixed with 25 g of sulphuric acid and 200 g of isopropanol. Upon addition of the isopropanol the soapstock rapidly lost viscosity and became translucent. The reaction mixture was heated and stirred until the mixture reached a temperature of 60° C. for 2 minutes. After heating the mixture was allowed to settle at room temperature for 8 hours. Three phases were observed after settling. An upper liquid phase of 620 g was separated from a lower liquid phase that had considerable amounts of precipitated solids. The weight of the combined lower phase was 600 g. The upper liquid phase was heated to remove volatile materials and approximately 220 grams of volatile was lost leaving 400 g of clear oil. Processing with isopropanol increased the yield of oil from this soapstock by 300%.

Example 5
Processing of a Commercial Soapstock that has Fermented During Storage with Isopropanol Fermented commercial soybean soapstock from the same sample used in example 3 (1000 g) was mixed with 25 g of sulphuric acid and 200 g of isopropanol. Upon addition of the isopropanol the soapstock rapidly lost viscosity and became translucent. The reaction mixture was heated and stirred until the mixture reached a temperature of 60° C. for 2 minutes. After heating the mixture was allowed to settle at room temperature for 8 hours. Three phases were observed after settling. An upper liquid phase of 610 g was separated from a lower liquid phase that had considerable amounts of floating solids. The weight of the combined lower phase was 610 g. The upper liquid phase was heated to remove volatile materials and approximately 205 grams of volatile was lost leaving 405 g of clear oil. Processing with isopropanol increased the yield of oil from this soapstock by 90%.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of the invention as defined in the following claims.

I claim:

1. A method for processing soapstock to quantitatively recover lipids, water-soluble organic compounds, and water-soluble inorganic compounds comprising the steps of:
   adding acid and an alcohol to the soapstock producing a phase separation between an aqueous phase and a lipid alcohol phase;
   processing the aqueous phase to recover water soluble components; and
   processing the lipid alcohol phase to recover acidulated soapstocks, enriched lipid fractions, or synthetic lipid compounds.

2. The method according to claim 1, wherein the soapstock is derived from an oil selected from the group consisting of canola, cottonseed, corn, palm, soybean, coconut, flax, rapeseed, mustard, safflower, hempseed, a vegetable oil, and combinations thereof.

3. The method according to claim 1, wherein the soapstock contains a metal soap of the oil wherein the metal present is selected from the group consisting of sodium, potassium, lithium, calcium, magnesium, a divalent metal, a trivalent metal, and combinations thereof.

4. The method according to claim 1, wherein the acid is selected from the group consisting of nitric, acetic, hydrochloric, sulfuric, phosphoric, citric, and combinations thereof.

5. The method according to claim 1, wherein the alcohol is a monohydric alcohol.

6. The method according to claim 5, wherein the monohydric alcohol is selected from the group consisting of n-propanol, isopropanol, n-butanol, isobutanol, t-butanol, n-amylalcohol, isoamylalcohol, and combinations thereof.

7. The method according to claim 6, wherein the alcohol includes a mixture of alcohols.

8. The method according to claim 7 wherein the mixture of alcohols is fusel oil.

9. The method according to claim 1, wherein a fatty acid enriched lipid fraction is recovered as an acidulated soapstock by evaporating alcohol solvent.

10. The method according to claim 1, wherein a fatty acid enriched lipid fraction is reacted at elevated temperatures to produce an alkyl ester of an alcohol used for extraction.

11. The method according to claim 1, wherein fatty acids are crystallized in an alcohol used for extraction.

12. The method according to claim 1, wherein fatty acids are subject to urea fractionation in an alcohol used for fractionation.

* * * * *